United States Patent Office 3,006,212
Patented Oct. 31, 1961

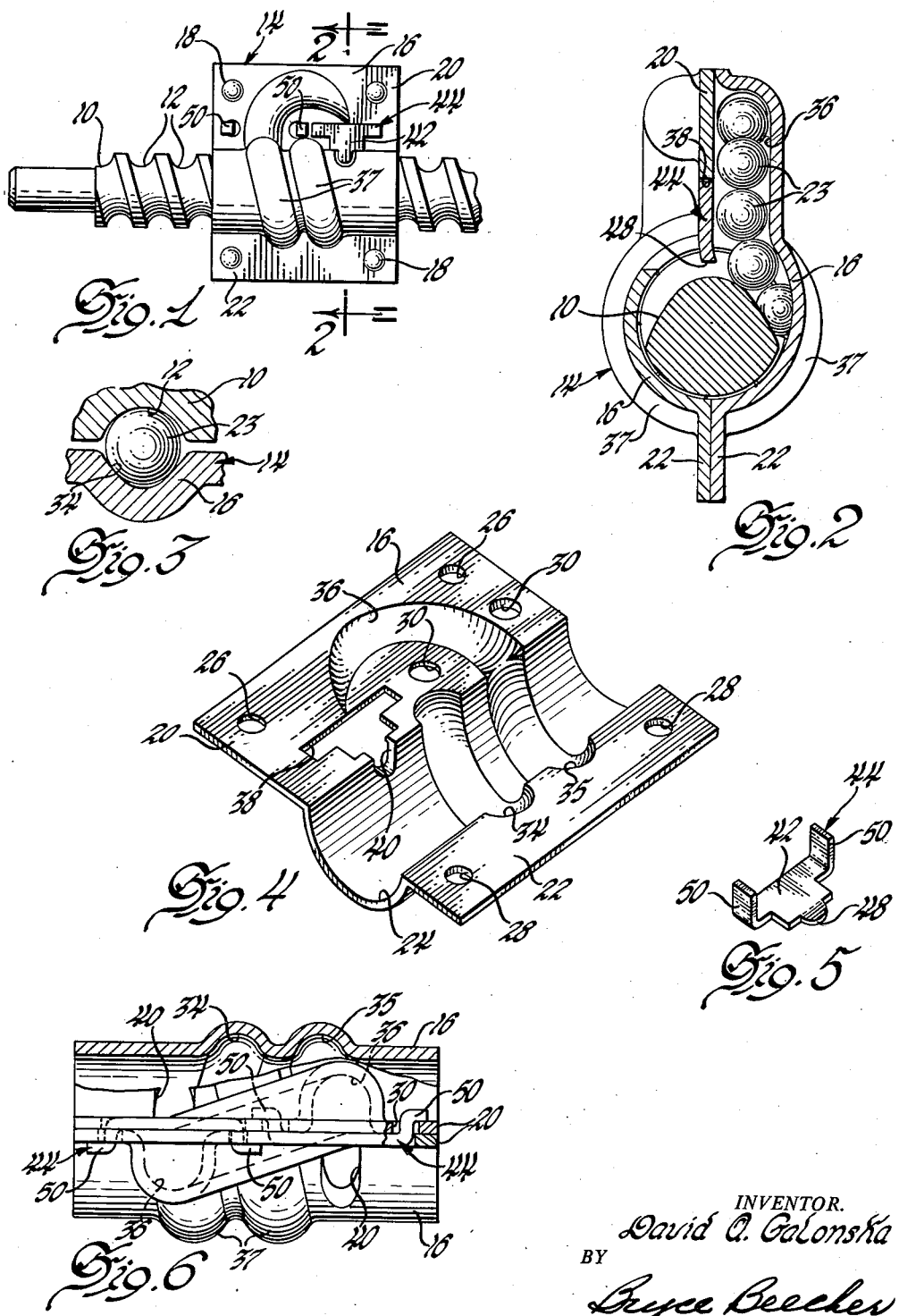

1

3,006,212
STAMPED BALL NUT
David A. Galonska, Saginaw, Mich., assignor to General Motors Corporation, Detroit, Mich., a corporation of Delaware
Filed Oct. 28, 1959, Ser. No. 849,244
6 Claims. (Cl. 74—459)

This invention relates to screw and nut gears of the type in which the screw and nut, in lieu of the customary threads, are formed with corresponding helical grooves which provide a passage for a train of balls constituting the connection between the screw and nut. More specifically, the invention concerns improvements in the stamped ball nut described and claimed in Hawkins Patent 2,581,482, granted January 8, 1952.

The Hawkins ball nut constitutes a significant advance in the art not only from a cost standpoint but also because of the ease with which such nut lends itself to miniaturization. However, due to the design thereof, it has been necessary at final assembly of the gear to retain the balls in one of the two nut halves by means of a suitable grease while the two halves are located about the screw, and this method has not proven altogether satisfactory.

The present invention aims to provide a stamped ball nut of a construction enabling introduction of the balls after the nut halves have been assembled on the screw.

Other objects and features of the invention will be apparent from the further description and the accompanying drawings illustrating a preferred embodiment. In the drawings, FIGURE 1 is an elevational view of a ball nut and screw assembly conforming to the invention, the screw being shown broken away;

FIGURE 2 is a section on the line 2—2 in FIGURE 1;

FIGURE 3 illustrates the ball connection between the nut and screw;

FIGURE 4 is a perspective view illustrating either of the two nut halves;

FIGURE 5 is a detail in perspective of one of the deflector elements used in the particular embodiment; and FIGURE 6 is a plan view of the nut component with certain parts sectioned, other parts being shown broken away or in broken lines.

Referring first to FIGURE 1, the numeral 10 denotes the screw component which is provided with a helical groove 12. Carried on the screw is a nut 14 formed of identical parts 16 (FIG. 4) joined together as by rivets 18.

Each part 16 has flange portions 20, 22 and a generally hemispherical portion 24. Flange portions 20 and 22 are respectively apertured at 26 and 28 in the interest of the riveting 18 and flange portion 20 additionally comprises a pair of apertures 30, the purpose of which will shortly appear.

The internal wall of the hemispherical portion of each part 16 has therein a pair of grooves 34, 35, reflected as rounded, raised portions 37 in FIGURE 1, while the larger flange portion 20 comprises an arcuate groove 36 representing a continuation of the groove 35. Grooves 34, 35 are formed on a radius slightly less than one-half the diameter of balls 23 (FIGURE 3).

An opening 38 in the larger flange portion 20 will be seen as contiguous with an opening 40 in the wall of the hemispherical portion 24. This opening 38 conforms in outline and dimensionally to the body portion 42 of a deflector element 44 (FIGURE 5). Thus, the body of the deflector element, which will be noted as having an integral finger 48 and integral tangs 50, is adapted to be fully accommodated in the opening 38 so that the walls of the element are flush with those of the flange portion 20.

Parts 16 may be formed following the same procedures and using the same dies. Preferably, each such part is manufactured by a process in which the sheet metal blank is first subject to a punching operation serving to provide the several openings which have been described. Thereafter, the punched blank is passed to a second machine incorporating a die providing the grooves 34, 35, 36 and the hemispherical conformation 24.

At assembly, the parts 16 are located about the screw 10 in face-to-face relation with one of the parts reversed endwise relative to the other. Following the joining of the two parts by means of the rivets 18 or, alternatively, by welding, for example, one of the two deflector elements 42 is secured in the openings 38 of one of the parts by passing the tangs 50 through the openings 30 in the other part and bending the tangs over as illustrated by FIGURES 1 and 6. This accomplished, the balls 23 in the required number are passed through the opening 40 in the last-mentioned part and the second deflector element 44 positioned and secured in place.

In the completed assembly, the inner face of each deflector element bridges the groove 36 in the opposed flange 20 and contacts the wall of the flange at either side of the groove.

It will be understood that the purpose of the fingers 48 is to deflect the balls into and out of the helical passage supplied by the worm groove 12 and the registering grooves 34 and 35 of the nut halves. The registering grooves 36 of the nut halves, as should by now be clear, afford a ball passage enabling recirculation of the balls.

What is claimed is:

1. In a stamped ball nut of the type described comprising a pair of mating parts grooved in a complementary manner to provide a helical ball race and a return ball passage interconnecting the ends of said race, the combination of a pair of deflector elements one at each end of said race, each said element carrying a finger portion extending through an opening in one of said parts into said race and further carrying tang means whereby such element is connected to one of said parts.

2. In a stamped ball nut of the type described comprising a pair of mating parts grooved in a complementary manner to provide a helical ball race and a return ball passage interconnecting the ends of said race, the combination of a pair of deflector elements one at each end of said race, each said element carrying a finger portion extending through an opening in one of said parts into said race and further carrying tang means extending through an opening in the other of said parts and serving to connect such element and said other part.

3. The combination of claim 2 where the body of such element is accommodated in an opening formed in the said one of said parts.

4. In a stamped ball nut comprising a pair of mating parts having flanges through which said parts are joined and further having grooved hemispherical portions providing a helical ball race, said flanges being grooved to supply a return ball passage interconnecting the end of said race, the combination of a pair of deflector elements one at each end of said race, each said element carrying a finger extending through an opening in the hemispherical portion of one of said parts into said race and further carrying tang means extending through an opening in a flange portion of the other of said parts and serving to connect such element and said other part.

5. In a stamped ball not comprising a pair of mating parts having flanges through which said parts are joined and further having grooved hemispherical portions providing a helical ball race, said flanges being grooved to supply a return ball passage interconnecting the ends of said race, the combination of a pair of deflector elements one at each end of said race, each said element carrying a finger extending through an opening in the hemispherical portion of one of said parts into said race and further carrying a pair of tangs extending through openings in a flange portion of the other of said parts and serving to connect such element and said other part.

6. The combination of claim 5 where the body of such element is accommodated in an opening in a flange portion of the said one of said parts, said last opening conforming in outline and dimensionally to the said body whereby the walls of the latter are disposed in flush relation to the walls of said last flange portion.

References Cited in the file of this patent

UNITED STATES PATENTS

| | | |
|---|---|---|
| 590,929 | Youngken | Sept. 28, 1897 |
| 601,451 | Stevenson | Mar. 29, 1898 |
| 1,704,031 | Boehm | Mar. 5, 1929 |
| 2,508,261 | Hosler | May 16, 1950 |
| 2,581,482 | Hawkins | Jan. 8, 1952 |
| 2,634,624 | Burt | Apr. 14, 1953 |
| 2,833,156 | Spontelli | May 6, 1958 |
| 2,855,792 | Gates | Oct. 14, 1958 |